(12) United States Patent
Sarwer et al.

(10) Patent No.: US 10,728,578 B2
(45) Date of Patent: Jul. 28, 2020

(54) BIAS MINIMIZATION FOR SUCCESSIVE IMAGE RECONSTRUCTION BASED ON EMBEDDED CODEC CIRCUITRY

(71) Applicant: SONY CORPORATION, Tokyo (JP)

(72) Inventors: Mohammed Golam Sarwer, San Jose, CA (US); Ali Tabatabai, San Jose, CA (US)

(73) Assignee: SONY CORPORATION, Tokyo (JP)

(*) Notice: Subject to any disclaimer, the term of this patent is extended or adjusted under 35 U.S.C. 154(b) by 163 days.

(21) Appl. No.: 15/912,825

(22) Filed: Mar. 6, 2018

(65) Prior Publication Data

US 2018/0255320 A1    Sep. 6, 2018

Related U.S. Application Data

(60) Provisional application No. 62/467,421, filed on Mar. 6, 2017.

(51) Int. Cl.
*H04N 19/60* (2014.01)
*H04N 19/124* (2014.01)
*H04N 19/65* (2014.01)
*H04N 19/91* (2014.01)

(52) U.S. Cl.
CPC .......... *H04N 19/60* (2014.11); *H04N 19/124* (2014.11); *H04N 19/65* (2014.11); *H04N 19/91* (2014.11)

(58) Field of Classification Search
CPC ........ H04N 19/60; H04N 19/91; H04N 19/65; H04N 19/124
USPC .................................................... 375/240.03
See application file for complete search history.

(56) References Cited

U.S. PATENT DOCUMENTS 8,599,925 B2    12/2013    Srinivasan
9,497,462 B2    11/2016    Oh et al.
2007/0041653 A1    2/2007    Lafon

FOREIGN PATENT DOCUMENTS

CN    102024266 A    7/2012

OTHER PUBLICATIONS

Sole, et al., "Transform coefficient coding in HEVC", IEEE Transactions on Circuits and Systems for Video Technology 22(12):1765-1777, Dec. 2012, 11 pages.

*Primary Examiner* — On S Mung
(74) *Attorney, Agent, or Firm* — Chip Law Group

(57) ABSTRACT

An embedded decoder circuitry for bias minimization in successively reconstructed images from a decoded image obtained from an encoded input image, includes an on-chip memory and a bias control circuit communicatively coupled to the on-chip memory. The on-chip memory stores transform-domain compressed data that includes a plurality of transform blocks of an input image. The bias control circuit is configured to determine a set of conditions associated with each transform coefficient in a transform block of the encoded input image and modify a set of transform coefficients from the plurality of transform coefficients in the transform block based on determination of the set of conditions. The bias control circuit is further configured to generate a decoded image that exhibits a reduced error propagation in successively reconstructed images with respect to the input image, based on inverse transformation of each transform block of the encoded input image.

23 Claims, 8 Drawing Sheets

US 10,728,578 B2

BIAS MINIMIZATION FOR SUCCESSIVE IMAGE RECONSTRUCTION BASED ON EMBEDDED CODEC CIRCUITRY

CROSS-REFERENCE TO RELATED APPLICATIONS/INCORPORATION BY REFERENCE

This application claims priority to U.S. Provisional Patent Application Ser. No. 62/467,421 filed on Mar. 6, 2017, the entire content of which is incorporated herein by reference.

FIELD

Various embodiments of the disclosure relate to image and video compression and decompression technology in embedded codec circuitry. More specifically, various embodiments of the disclosure relate to bias minimization for successive image reconstruction based on embedded codec circuitry.

BACKGROUND

With recent advancements in media codecs, there has been a rise in the adoption of embedded in-loop codecs (EBC) that are usually coupled to other media codecs, such as video codecs. Such embedded in-loop codecs (EBC) may be utilized to successively generate reconstructed images (from encoded images) based on the requirements of coupled media codecs. The successively reconstructed images from the decoded image may be utilized to efficiently store compressed images/videos in memory that may be otherwise limited by size for storage of raw version of the compressed images/videos. With successive generation of encoded and decoded version of an image, a bias may be introduced or present in multiple reconstructions of images that may be successively generated based on the decoded image. The bias may be a visual artifact that may be pronounced with the degraded quality of the decoded image, and is measured by shift in peak signal to noise ratio (PSNR) values with generation of reconstructed images in each iteration.

In traditional solutions, a de-blocking filter may be utilized as an in-loop filter to remove any block artifacts that may affect the visual quality of the decoded image. The de-blocking filter may be applied after the inverse transformation is done on the encoded transform domain data to smoothen sharp edges that may be present between macro blocks of the encoded frames and further increase prediction performance from residual compressed data for subsequent frames. However, the de-blocking filter may be inefficient to reduce the visual artifacts and PSNR shifts that may occur in successively reconstructed images that may be generated based on the decoded image.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded decoder circuitry and a method for bias minimization for successive image reconstruction in the embedded codec circuitry substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded decoder circuitry for bias minimization with successive image reconstruction based on embedded codec circuitry. The embedded decoder circuitry may include a bias control circuit that may be configured to minimize visual artifacts that may be generated in multiple reconstructed images successive generated based on a decoded image. Bias compensation in the embedded decoder circuitry enhances the visual quality of images that are obtained by decoding the encoded images stored in the external memory (for example, DRAM). As the embedded decoder circuitry may be coupled with advanced video encoders and decoders, the quality of the reference images as well as the quality of other videos or images that may be processed through such encoders may be improved over time. The bias compensation may be a transform block-level compensation in the transform domain (or the compression domain) as compared to pixel level compensation at the decoder output. Such compensation may further minimize effect of different visual artifacts that may occur with successive generation of encoded or decoded images. Also, the minimization of bias at the embedded decoder circuitry improves prediction performance of the other media encoders that rely on the output from the embedded decoder circuitry. Further, the bias compensation may be achieved without any significant impact on compression/decompression performance, resource utilization, speed of execution, energy consumption, or other parameters associated with the image or the codec. As such embedded decoder circuitry may be coupled as an embedded in-loop decoder circuitry instead of a post filter, therefore the embedded decoder circuitry may process the compressed domain data that may require lower memory bandwidth and offer faster computational efficiency.

Figure 1:
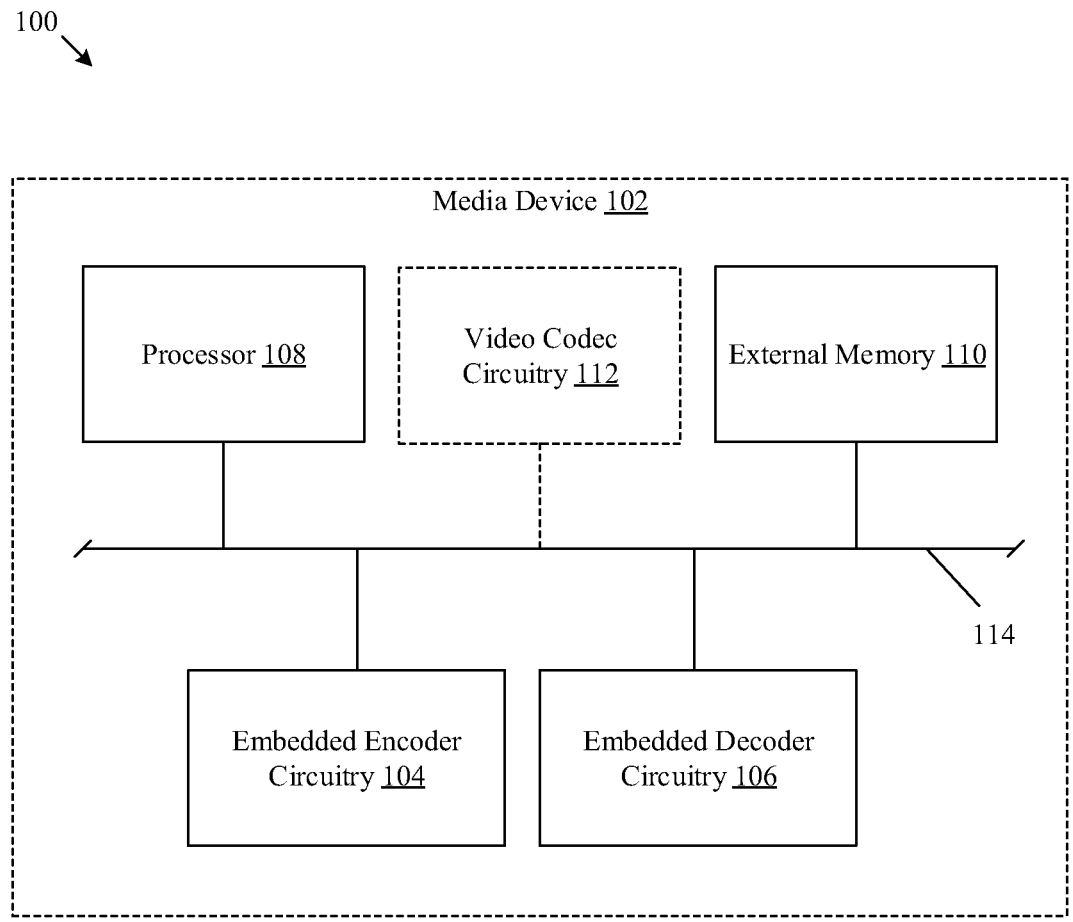
FIG. 1 is a block diagram that illustrates an exemplary arrangement of different circuitries for bias minimization with successive image reconstruction in embedded codec circuitry, in accordance with an embodiment of the disclosure.

FIG. 1 is a block diagram that illustrates an exemplary arrangement of different circuitries for bias minimization with successive image reconstruction based on embedded codec circuitry, in accordance with an embodiment of the disclosure. With reference to FIG. 1, there is shown a media device 102 that includes an embedded encoder circuitry 104, an embedded decoder circuitry 106, a processor 108, and an external memory 110. In some embodiments, a video codec circuitry 112 may be externally interfaced with the embedded encoder circuitry 104 and the embedded decoder circuitry 106. The embedded encoder circuitry 104, the embedded decoder circuitry 106, the processor 108, the external memory 110, and the video codec circuitry 112 may be interfaced with each other via a system bus 114.

The media device 102 may comprise suitable logic, circuitry, interfaces that may be configured to facilitate storage, decoding of media content (for example, encoded videos or images) and playback of the decoded media content at a display screen interfaced with the media device 102. The media device 102 may include a dedicated video codec, an image codec, external memory 110, and other computational circuitries for an offline decoding of the media content at the media device 102. Examples of the media device 102 may include, but are not limited to, a media server, a portable communication device (e.g. laptops, smartphones, tablets, phablets, smart watches, smart glasses, etc.), a workstation, a desktop computer, and a digital camera.

The embedded encoder circuitry 104 may comprise suitable logic, circuitry, and interfaces that may be configured to encode an input image (raw image) by a specific compression factor. The embedded encoder circuitry 104 may further facilitate storage of the encoded input image in the external memory 110 or may facilitate transfer of the encoded input image to other media devices via dedicated communication networks. In accordance with an embodiment, the embedded encoder circuitry 104 may be implemented as a specialized hardware encoder interfaced with the other computational circuitries of the media device 102. In such implementation, the embedded encoder circuitry 104 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the embedded encoder circuitry 104 may be further interfaced with a graphical processing unit (GPU) to parallelize operations of the embedded encoder circuitry 104. In accordance with yet another embodiment, the embedded encoder circuitry 104 may be implemented as a combination of programmable instructions stored in the memory and logical units (or programmable logic units) on a hardware circuitry in the media device 102.

The embedded decoder circuitry 106 may comprise suitable logic, circuitry, and interfaces that may be configured to decode an encoded input image compressed by a specific compression factor. Such decoded image may be transferred to different circuitries that may utilize the decoded image as a reference frame to predict subsequent frames in video encoders or video decoders and to display the decoded image on a display screen associated with the media device 102. In accordance with an embodiment, the embedded decoder circuitry 106 may be implemented as a specialized hardware decoder interfaced with the other computational circuitries of the media device 102. In such implementation, the embedded decoder circuitry 106 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the embedded decoder circuitry 106 may be further interfaced with a graphical processing unit (GPU) to parallelize operations of the embedded decoder circuitry 106.

The processor 108 may comprise suitable logic, circuitry, and interfaces that may be configured to execute a set of instructions stored in a dedicated memory. The processor 108 may be implemented based on a number of processor technologies known in the art. Examples of the processor 108 may include, but are not limited to, a Graphical Processing Unit (GPU), a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The external memory 110 may comprise suitable logic, circuitry, and interfaces that may be configured to store transform domain compressed data that may include a plurality of transform blocks of an input image encoded by the embedded encoder circuitry 104. Additionally, the external memory 110 may store data associated with sequential encoding/decoding schemes for a bit-stream of compressed image data of the encoded input image. The external memory 110 may further store instructions and control signal data that may be utilized to decode the transform domain compressed data of the encoded input image or encode the input image to the compressed data. In an exemplary embodiment, the external memory 110 may be at least one dynamic random access memory (DRAM) circuit that may be externally interfaced with the video codec circuitry 112, the embedded encoder circuitry 104, and the embedded decoder circuitry 106. In another exemplary embodiment, the external memory 110 may be at least one static random access memory (SRAM) that may be externally interfaced with the video codec circuitry 112, the embedded encoder circuitry 104, and the embedded decoder circuitry 106. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The video codec circuitry 112 may comprise suitable logic, circuitry, and interfaces that may be configured to encode media content (for example, videos or images) for transmission to other devices via communication network and decode media content for playback at the media device 102. The video codec circuitry 112 may include a video encoder circuitry that may utilize techniques that rely on encoding residuals and differences in different frames instead of encoding individual frames of the media content. Further, the video codec circuitry 112 may include a video decoder circuitry that may utilize reference frames and other frames (such as I frames, P frames, and B frames) to decode the encoded media content. The video codec circuitry 112 may be interfaced in loop with at least one pair of the embedded encoder circuitry 104 and the embedded decoder circuitry 106 at either of the encoder side or the decoder side. The video codec circuitry 112 may be implemented by known codec standards that may include Advanced Video Codec (AVC)/Media Experts Group (MPEG-4/AVC) or H.264, MPEG-4/HEVC or H.265, and the like. Additionally, the video codec circuitry 112 may be supported by other codec libraries that may include FFmpeg, Xvid, DIVx, VP1-9, Windows Media Codec, FFays, and the like.

The system bus 114 may be a hardware bus that may include a set of data channels (or conductive paths) to different components of the media device 102. Alternatively stated, the system bus 114 may interconnect at least data ports, address ports, and control signal ports of different components of the media device 102. For example, the system bus 114 may interconnect the processor 108, the video codec circuitry 112, the embedded encoder circuitry 104, the embedded decoder circuitry 106, the external memory 110, and other circuitries to each other. The system bus 114 may be configured to provide a serial data communication or parallelized data communication between different components on-board the media device 102. Examples of the system bus 114 may include an 8-bit parallel single system bus, a 16-bit parallel single system bus, a 32-bit parallel single system bus, a 64-bit parallel single system bus, a serial data bus, and the like.

In operation, an input image may be received by the media device 102. The input image may be received from one of an image capture device (for example, a camera or a video cam) in-built in the media device 102 or from a media server via a communication network. In accordance with an embodiment, the input image may be a reference frame (or a video frame) of a video feed captured from at least one of the image capture device or a media server. In such a case, the input image may be compressed and stored in the external memory 110 (such as the DRAM) and iteratively decoded and transferred to the video codec circuitry 112 to successively encode or decode consecutive frames of a video feed associated with the input image. In accordance with another embodiment, the input image may be a raw input image received from at least one of the image capture device or a media server. In such a case, the input image may be encoded and stored in the external memory 110 as an encoded input image without any dependence on the video codec circuitry 112.

At the encoder stage, the embedded encoder circuitry 104 may be configured to execute a sequential encoding scheme on an input image of a received set of input images. In the sequential encoding scheme, the embedded encoder circuitry 104 may apply a forward transform to the input image to generate transform domain compressed data from the input image. In accordance with an embodiment, the forward transform may be based on a family of sinusoidal unitary transforms (that includes a family of orthonormal bases or eigenvectors). Examples of the forward transform may include, but are not limited to, type I-VIII Discrete Cosine Transform (DCT), type I-VIII Discrete Sine Transform (DST), and Karhunen Loave Transform (KLT). The generated transform domain compressed data may include a plurality of transform blocks (for example, an "8×8" block of DCT coefficients), each of which may include a plurality of transform coefficients that may be either associated with float values or integer values.

The embedded encoder circuitry 104 may further quantize the generated transform domain data to a plurality of quantization levels that may be differentiated by a plurality of discretized quantization bins. A step size for the plurality of quantization bins may be further selected adaptively or uniformly to efficiently quantize each transform block of the plurality of transform coefficients into the plurality of quantization levels. With quantization, the embedded encoder circuitry 104 may remove irrelevant coefficient information from the transform domain data without a visually noticeable degradation of quality. Such plurality of quantization bins may be determined based on a quantization parameter (QP), which may vary with a defined rate in accordance with an adaptive quantization scheme to encode or decode the media content. The QP may vary from 0 to a bit depth of the bit-stream of compressed image data. For example, a QP for an 8-bit bit-stream of compressed image data may be selected as "7" for a first block of transform coefficients and "0" for a second block of transform coefficients, which may imply that the first block of transform coefficients may be quantized with a finer step size and the second block may not be quantized at all.

The embedded encoder circuitry 104 may be further configured to apply a residual prediction scheme on the plurality of quantization levels to generate a plurality of transformed residual levels, which may correspond to a transform block in the transform domain data. For example, the residual prediction scheme may be based on one of a Discrete Pulse Code Modulation (DPCM) scheme or an Adaptive DPCM (A-DPCM) scheme. In such schemes, instead of utilizing each quantization level, a residue is predicted from reference quantization levels. The embedded encoder circuitry 104 may be further configured to apply an entropy encoding scheme to the generated plurality of transformed residual levels, to generate a bit-stream of compressed image data. Such bit-stream of compressed image data may be stored in the external memory 110 and further transmitted upon request to the embedded decoder circuitry 106. For example, the entropy encoding scheme may be based on one of Huffman Encoding Scheme, an Arithmetic Encoding Scheme, and the like. The bit-stream of the compressed image data may represent the encoded version of the input image and may be stored in the external memory 110, such as the DRAM.

At the decoder stage, the embedded decoder circuitry 106 may be further configured to retrieve the bit-stream of compressed image data stored in the external memory 110 as an encoded form of the input image. Thereafter, the embedded decoder circuitry 106 may be further configured to execute a sequential decoding scheme on the bit-stream of compressed image data (of the encoder image) to generate a decoded image that may exhibit a minimum degradation of visual quality from the input image.

In the sequential decoding scheme, the embedded decoder circuitry 106 may be configured to initially execute an entropy decoding scheme on the retrieved bit-stream of compressed image data. A portion of the retrieved bit-stream of compressed image data for the encoded input image may be decoded to a plurality of transformed residual levels for a specific block of compressed image data. Each transformed residual level may be a difference of a predicted quantization level from a given quantization level around a quantization bin. Thereafter, for each block of data, the embedded decoder circuitry 106 may execute an inverse residual prediction scheme on the plurality of transformed residual levels. Alternatively stated, with application of the inverse residual prediction scheme for a specific block of compressed image data, the plurality of quantization levels may be reconstructed from the plurality of transformed residual levels. In some embodiments, the inverse residual prediction scheme may be based on an inverse differential pulse code modulation (I-DPCM) scheme.

The embedded decoder circuitry 106 may be further configured to apply an inverse quantization scheme on the plurality of quantization levels of the compressed image data to obtain a plurality of transform blocks such that each transform block may include a plurality of transform coefficients. The application of the inverse quantization scheme may be associated with a known value of the quantization parameter, quantization steps, or quantization bins that may have been utilized to generate the plurality of quantization levels at the encoder stage. The quantization parameter may be stored along with the bit-stream of the compressed image data in the external memory 110.

The inverse quantization of the plurality of quantization levels may generate transform coefficients that may be an approximation of the transform coefficients generated at the encoder stage. Alternatively stated, the plurality of transform coefficients in each block may include a portion of transform coefficients that may imprecisely model a portion of the input image, which may be noticeable as a visual artifact in the decoded image, for example, a block artifact in the decoded image. For example, some of the DCT transform coefficients that may have values close to "10" may be assigned a quantization level of "12". Such DCT quantization levels when processed for inverse quantization may be assigned a uniform DCT transform coefficient value of "12". However, the variation may not be accounted in the inverse quantized transform coefficient values, which may cause visual artifacts in the decoded image. The decoded image with such visual artifacts may be utilized as a reference frame to iteratively generate prediction data for successive frames at the encoder end of the video codec circuitry 112 or to reconstruct successive frames at the decoder end of the video codec circuitry 112. With successive generation of encoding and decoding, the successively generated images may exhibit a bias that may increase with every successive generation of encoding and decoding. In some cases, such bias may be measured based on a shift in Peak Signal to Noise Ratio (PSNR-Shift in decibels). Therefore, the embedded decoder circuitry 106 may be configured to minimize the bias during reconstruction of different transform blocks obtained post inverse quantization at the embedded decoder circuitry 106.

To minimize the bias, the embedded decoder circuitry 106 may initially determine a set of conditions associated with each transform coefficient in a transform block of the plurality of transform blocks of the encoded input image. Such determination of the set of conditions may be based on a set of parameters associated with each transform coefficient of a plurality of transform coefficients in the transform block. Such set of parameters associated with each transform coefficient may include a quantization parameter, an absolute value of a transform coefficient, a transform type for the transform block, a specific coefficient distribution pattern of a luma block and at least one chroma block, and the like.

The embedded decoder circuitry 106 may be further configured to modify a set of transform coefficients from the plurality of transform coefficients in the transform block based on determination of the set of conditions associated with each transform coefficient in the transform block. The set of transform coefficients may be modified to compensate for the bias that may be in successively reconstructed images generated from a decoded image. Thereafter, the embedded decoder circuitry 106 may be configured to apply an inverse transformation on the plurality of transform blocks that includes each modified transform block of the encoded input image. The inverse transformation on the plurality of transform blocks (including the modified transform blocks) may generate a plurality of blocks of the decoded image that may exhibit a minimum value of a PSNR in successively reconstructed images from the decoded image, with respect to the input image.

In some embodiments, the decoded image may be further stored in a decoded image buffer or further transferred to the video codec circuitry 112 that may utilize the decoded image to encode a raw uncompressed video or decode an encoded video, without generation of noticeable PSNR shift or bias in successive generation of encoding/decoding. In other embodiments, the decoded image may be visualized on a display screen of the media device 102 or transmitted to other media servers that may utilize the decoded image for encoding/decoding videos.

In some embodiments, the decoded image may be analyzed for a bias factor (or PSNR-shift) in each successively reconstructed images based on the decoded image. The bias factor may be compared with a threshold value of the bias factor to determine a performance of the embedded decoder circuitry 106 and optimally select a compensation scheme that may utilize optimal set of conditions to modify the transform blocks (or coefficients) in an optimal manner. The detailed operation of embedded decoder circuitry 106 and bias minimization has been further provided in detail, for example in FIGS. 2, 3, 4A, 4B, 5A, 5B, and 5C.

Figure 2:
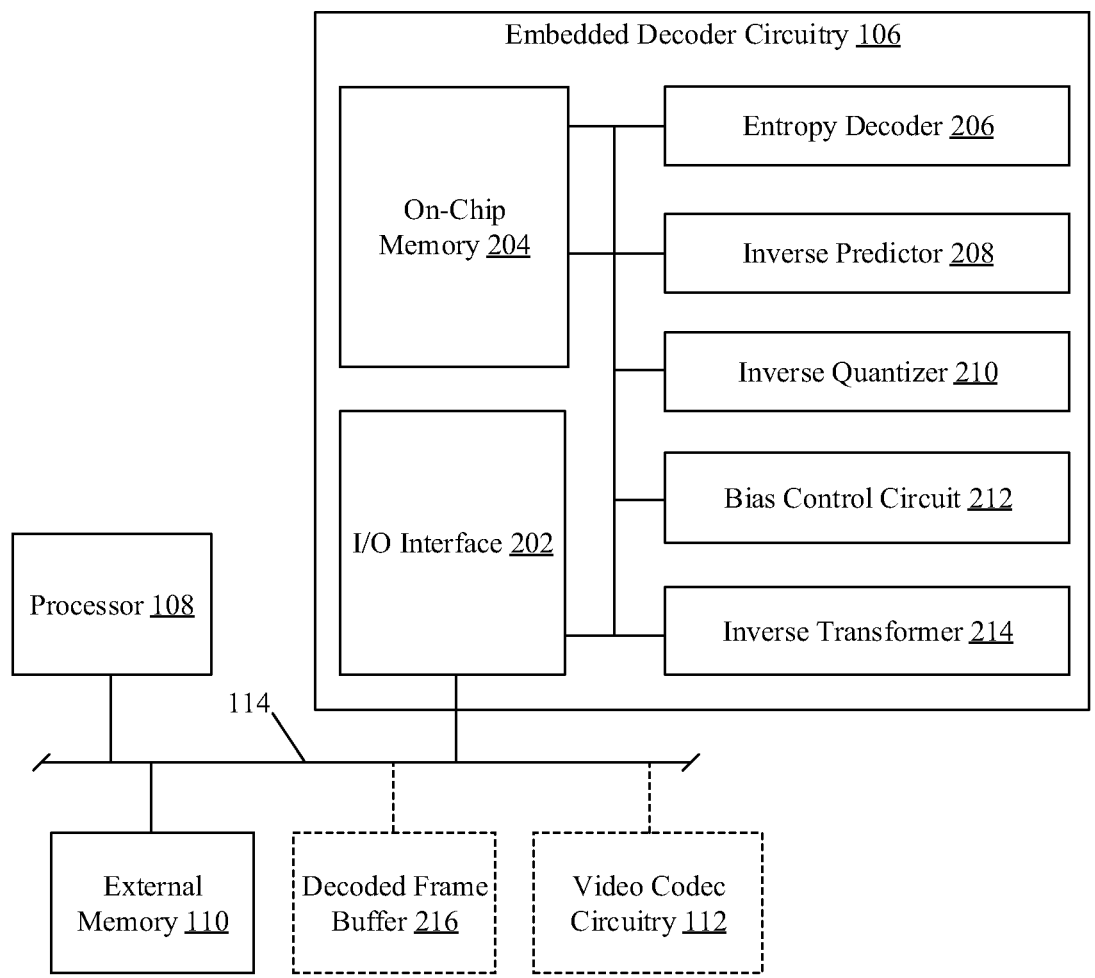
FIG. 2 is a block diagram that illustrates an embedded decoder circuitry with various peripheral components for bias minimization in successive image reconstruction, in accordance with an embodiment of the disclosure.

FIG. 2 is a block diagram that illustrates an embedded decoder circuitry 106 with various peripheral components for bias minimization in successive image reconstruction, in accordance with an embodiment of the disclosure. FIG. 2 is explained in conjunction with elements from FIG. 2. With reference to FIG. 2, there is shown a block diagram of the embedded decoder circuitry 106. The embedded decoder circuitry 106 may include an Input/output (I/O) interface 202, an on-chip memory 204, an entropy decoder 206, an inverse predictor 208, an inverse quantizer 210, a bias control circuit 212, and an inverse transformer 214. Additionally, in some embodiments, the embedded decoder circuitry 106 may be communicatively coupled to a decoded frame buffer 216, via the system bus 114.

The I/O interface 202 may comprise suitable logic, circuitry, and interfaces that may be configured to provide a plurality of I/O ports to facilitate exchange of communication data from other peripheral circuitries, via the system bus 114, for example, the external memory 110, the processor 108, or the video codec circuitry 112. The communication data may include a bit-stream of the compressed image data, the bit-stream of decoded image data, control signals, and the like. The configuration of the I/O ports may depend on a specification of the embedded decoder circuitry 106, for example, physical I/O pins in an ASIC, FPGA or SOC chip.

The on-chip memory 204 may comprise suitable logic, circuitry, and interfaces that may be configured to store different data that may be utilized by different components of the embedded decoder circuitry 106 to decode or reconstruct the encoded input image. Examples of the data that the on-chip memory 204 may be configured to store may include, but are not limited to, bit-stream of compressed image data, intermediate transform-domain data, quantization levels, transformed residual levels, and decoded pixel blocks. The on-chip memory 204 may be implemented as a specific memory designed with a defined memory specification, such as R/W speed, memory size, fabrication factors, and the like. Examples of the on-chip memory 204 may include, but are not limited to, static random access memory (SRAM), dynamic access memory (DRAM), and Static Dynamic RAM (SD-RAM).

The entropy decoder 206 may comprise suitable logic, circuitry, and interfaces that may be configured to decode a bit-stream of compressed image data of an encoded input image to generate a plurality of transformed residual levels. Such generated plurality of transformed residual levels may be decoded based on a specific entropy decoding scheme for a specific entropy encoding scheme associated with the bit-stream of compressed image data. In some embodiments, the entropy decoder 206 may be implemented as a hardware entropy decoder that may be based on one of ASIC, programmable logic devices (PLDs), SOC, FPGA, digital signal processors (DSPs) or other specialized circuitries. In other embodiments, the entropy decoder 206 may be implemented as a combination of hardware and stored set of instructions in the on-chip memory 204 (for example, instructions based on VHDL or HDL logic).

The inverse predictor 208 may comprise suitable logic, circuitry, and interfaces that may be configured to apply an inverse prediction scheme on the plurality of transformed residual levels to generate a plurality of associated quantization levels that may be differentiated by a plurality of discretized quantization bins. In accordance with an embodiment, the inverse prediction scheme may be based on inverse DPCM or inverse ADPCM techniques. In some embodiments, the inverse predictor 208 may be implemented as a hardware inverse predictor that may be based on one of ASIC, PLDs, SOC, FPGA, DSP or other specialized circuitries. In other embodiments, the inverse predictor 208 may be implemented as a combination of hardware and stored set of instructions in the on-chip memory 204 (for example, instructions based on VHDL or HDL logic).

The inverse quantizer 210 may comprise suitable logic, circuitry, and interfaces that may be configured to apply an inverse quantization scheme on the plurality of quantization levels to generate a plurality of transform blocks. Each transform block may be an array of a plurality of transform coefficients of a specific size, for example, "8×8" transform block of "64" DCT transform coefficients. In some embodiments, the inverse quantizer 210 may be implemented as a hardware inverse quantizer that may be based on one of ASIC, PLDs, SOC, FPGA, DSP or other specialized circuitries. In other embodiments, the inverse quantizer 210 may be implemented as a combination of hardware and stored set of instructions in the on-chip memory 204 (for example, instructions based on VHDL or HDL logic).

The bias control circuit 212 may comprise suitable logic, circuitry, and interfaces that may be configured to determine a set of parameters associated with each transform coefficient and modify a set of transform coefficients of the plurality of transform coefficients in a transform block. Such modification may be done to minimize a bias and compensate for a loss of image data in successively reconstructed images generated based on the decoded image. In some embodiments, the bias control circuit 212 may be implemented as a hardware bias control circuit that may be based on one of ASIC, PLDs, SOC, FPGA, DSP or other specialized circuitries. In other embodiments, the bias control circuit 212 may be implemented as a combination of hardware and stored set of instructions in the on-chip memory 204 (for example, instructions based on VHDL or HDL logic).

The inverse transformer 214 may comprise suitable logic, circuitry, and interfaces that may be configured to apply an inverse transformation scheme on the plurality of transform coefficients that also includes the modified set of transform coefficients. The inverse transformation scheme may be applied on each transform block to generate the decoded bit-stream of image data that may be referred to as the decoded image. Examples of the inverse transformation scheme may include, but are not limited to, DCT Type I, DCT Type II, DST Type I, DST Type II, and (short time Fourier transform) STFT Type I. In some embodiments, the inverse transformer 214 may be implemented as a hardware inverse transformer that may be based on one of ASIC, PLDs, SOC, FPGA, DSP or other specialized circuitries. In other embodiments, the inverse transformer 214 may be implemented as a combination of hardware and stored set of instructions in the on-chip memory 204 (for example, instructions based on VHDL or HDL logic).

The decoded frame buffer 216 may comprise suitable logic, circuitry, and interfaces that may be configured to store a set of decoded images generated from the embedded decoder circuitry 106. The set of decoded images may be utilized by the video codec circuitry 112 to encode raw video data or decode an encoded video. In some embodiments, the decoded frame buffer 216 may be implemented on a temporary memory storage as a portion of the external memory 110. In other embodiments, the decoded frame buffer 216 may be implemented as a storage unit separate from the external memory 110.

In operation, a bit-stream of compressed image data stored on the external memory 110 may be retrieved in the on-chip memory 204 of the embedded decoded circuitry, via the I/O interface 202. The embedded decoder circuitry 106 may be configured to execute, using the processor 108, a sequential decoding scheme on the bit-stream of compressed image data of the encoded input image based on header information in the bit-stream of the compressed image data. The header information may indicate a sequential encoding scheme applied at encoding of a plurality of patches of the input image to obtain the bit-stream of compressed image data of the encoded input image. In accordance with an embodiment, the sequential decoding scheme may include a sequential application of entropy decoding followed by inverse discrete pulse code modulation (DPCM), inverse quantization, and inverse transformation of the plurality of transform domain data.

The entropy decoder 206 may be configured to decode, using the processor 108, a portion of the retrieved bit-stream of compressed image data of the encoded input image to a plurality of transformed residual levels for a specific block of compressed image data. Alternatively stated, the bit-stream of compressed image data may be decompressed by a specific factor to a plurality of transformed residual levels, in which each transformed residual level may be represent a syntax element of a symbol in the bit-stream of the compressed image data. The entropy decoder 206 may map, using the processor 108, a plurality of code words (a set of bits of a specific length) to a plurality of syntax elements, such as applicable prediction modes, motion vectors, intra-prediction data, flags, residues, indices, modes, or transform-domain information. Thereafter, a set of code words that may be related to the plurality of transformed residual levels of an encoded block of the input image may be identified and decoded to obtain the plurality of transformed residual levels. The plurality of transformed residual levels may be obtained based on application of a specific entropy decoding scheme, which may be an inverse of the entropy decoding scheme, for example, a context adaptive variable length code based scheme (CAVLC) and a context adaptive binary arithmetic coding scheme (CABAC).

The plurality of code words (set of bits in the bit-stream of compressed image data) may be associated with a compression factor of entropy encoded bit-stream of compressed image data. Each code word may be implemented based on one of Unary codes, Golomb codes, Huffman Codes, Arithmetic codes, and the like. For example, a variable length code may be compressed based on binary arithmetic codes (BACs) or Huffman codes (HCs) and a factor for compression (or decompression may be based on a probabilistic distribution of occurrences of code words (or symbols) in the bit-stream of compressed image data.

The plurality of transformed residual levels may be stored in the on-chip memory 204 and further transferred to the inverse predictor 208. The inverse predictor may be configured to determine, using the processor 108, the plurality of quantization levels associated with a plurality of quantization bins from the plurality of transformed residual levels obtained post the application of the entropy decoding scheme at the entropy decoder 206. Each quantization level may be a mid-value from an upper bound and a lower bound of a quantization bin, for example, a quantization bin of "(155,175)" may include a quantization level of "(155+175)/2", i.e. "165". The determination of the plurality of quantization levels may be done based on an inverse prediction scheme, such as inverse DPCM or inverse adaptive-DPCM.

The plurality of quantization levels may be further stored in the on-chip memory 204 and transferred to the inverse quantizer 210. The inverse quantizer 210 may be configured to determine, using the processor 108, a plurality of transform blocks with a plurality of transform coefficients in each transform block. Such plurality of transform blocks may be determined based on an application of an inverse quantization scheme on the plurality of quantization levels of the compressed image data. The application of the inverse quantization scheme may be associated with a known value of the quantization parameter, quantization steps, or quantization bins that may have been utilized to generate the plurality of quantization levels at the encoder stage. The quantization parameter (QP) may be stored along with the plurality of bit-stream of compressed image data (or in the header) stored in the external memory 110.

In accordance with an embodiment, each transform block may be stored as a matrix, with each matrix element represented by a transform coefficient. The matrix representation of the transform block may spatially map a block (or a patch) of the input image transformed block wise at the encoder stage. The on-chip memory 204 may be configured to store transform domain compressed data that may include the plurality of transform blocks of the input image encoded by the embedded encoder circuitry 104.

In accordance with an embodiment, some of the transform blocks may include a portion of transform coefficients that either may fall in a dead zone around the zero value of the quantization bin or may imprecisely model a portion of the input image. Such portion of transform coefficients in each block may cause a visual artifact in the decoded image, for example, a block artifact in the decoded image. Such variation may be further visually perceptible when multiple reconstructed images (or predicted images) are generated from successive generations of encoding/decoding of the encoded input image. For example, a first predicted frame in a video codec circuitry 112 based on the decoded image may include a specific level of visual artifact, and a second predicted frame that utilizes the first predicted frame may further include more visual artifacts and such visual artifacts may be propagated and thereby cause a bias (or PSNR-shift) in successively decoded frames. Therefore, the embedded decoder circuitry 106 may include a bias control circuit 212 to compensate, using the processor 108, for the bias (or PSNR shift) that may occur in multiple reconstructions (or generations) of the decoded image.

The bias control circuit 212 may be configured to utilize the processor 108 to receive the transform-domain compressed data from the inverse quantizer 210 that may include the plurality of transform blocks of the encoded input image. Such plurality of transform blocks may be obtained after sequential application of entropy decoding followed by inverse discrete pulse code modulation (DPCM) and inverse quantization on the bit-stream of compressed image data. The bias control circuit 212 may be further configured to utilize the processor 108 to determine a set of conditions associated with each transform coefficient in a transform block of the plurality of transform blocks of the encoded input image. Such set of conditions may be determined based on a set of parameters associated with each transform coefficient of the plurality of transform coefficients in the transform block. The set of parameters associated with each transform coefficient may include a quantization parameter (QP), an absolute value of a transform coefficient, a transform type for the transform block, a specific coefficient distribution pattern of a luma block, and at least one chroma block.

After the determination stage, the bias control circuit 212 may be further configured to modify a set of transform coefficients from the plurality of transform coefficients in the transform block. The modifications of the set of transform coefficients may be done based on determination of the set of conditions associated with each transform coefficient in the transform block. Alternatively stated, the modification of the set of transform coefficients may be done based on positive or negative determination of the set of conditions for each transform coefficient of the plurality of transform coefficients. The set of transform coefficients may be modified to compensate for a bias generated in successively reconstructed images based on the decoded image from the embedded decoder circuitry 106. The set of transform coefficients may correspond to those coefficient values that require a modification for bias minimization and image refinement in successive generations of the other frames based on the decoded image. The bias control circuit 212 may modify, using the processor 108, the set of transform coefficients for image reconstruction and bias removal in successively reconstructed images from a decoded image, after the application of the inverse quantization and before the inverse transform in the sequential decoding scheme.

Figure 5A:
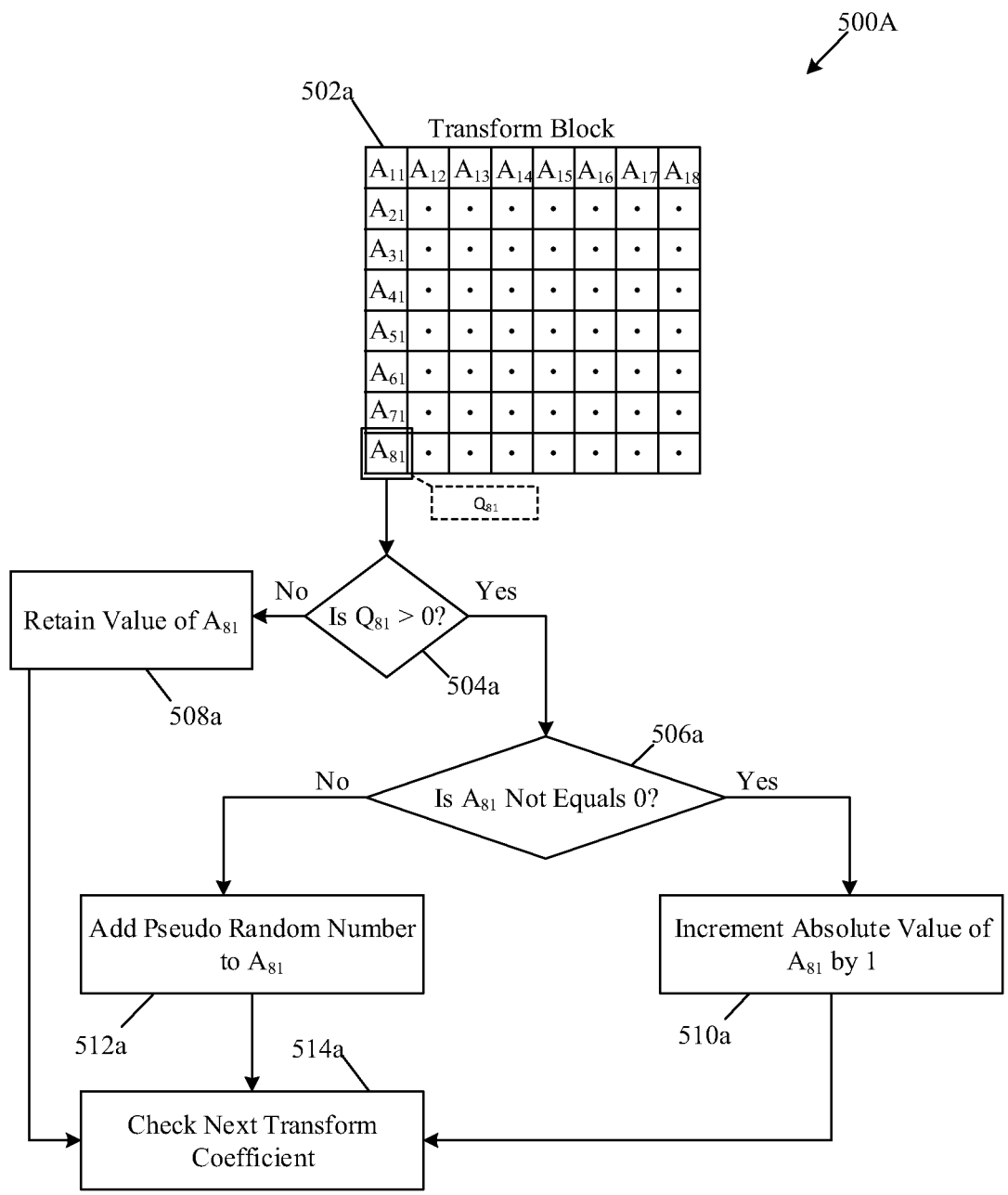
FIG. 5A is a decisional flow diagram that illustrates a first method for bias minimization with successive image reconstruction based on embedded codec circuitry, in accordance with an embodiment of the disclosure.

Determination of Conditions and Coefficient Modification:

In accordance with an embodiment, the bias control circuit 212 may be configured to determine, using the processor 108, a first condition associated with a transform coefficient (as further described, for example in FIG. 5A). The first condition may require a check on a quantization parameter and a value of the transform coefficient. In accordance with a first condition of the set of conditions, the bias control circuit 212 may be configured to utilize the processor 108 to generate a pseudo random number for a transform coefficient that may be associated with a non-zero quantization parameter for the transform coefficient and an absolute value of the transform coefficient may be zero. The pseudo random number can be generated from the previously executed module, such as a number of refinement bits.

Figure 5B:
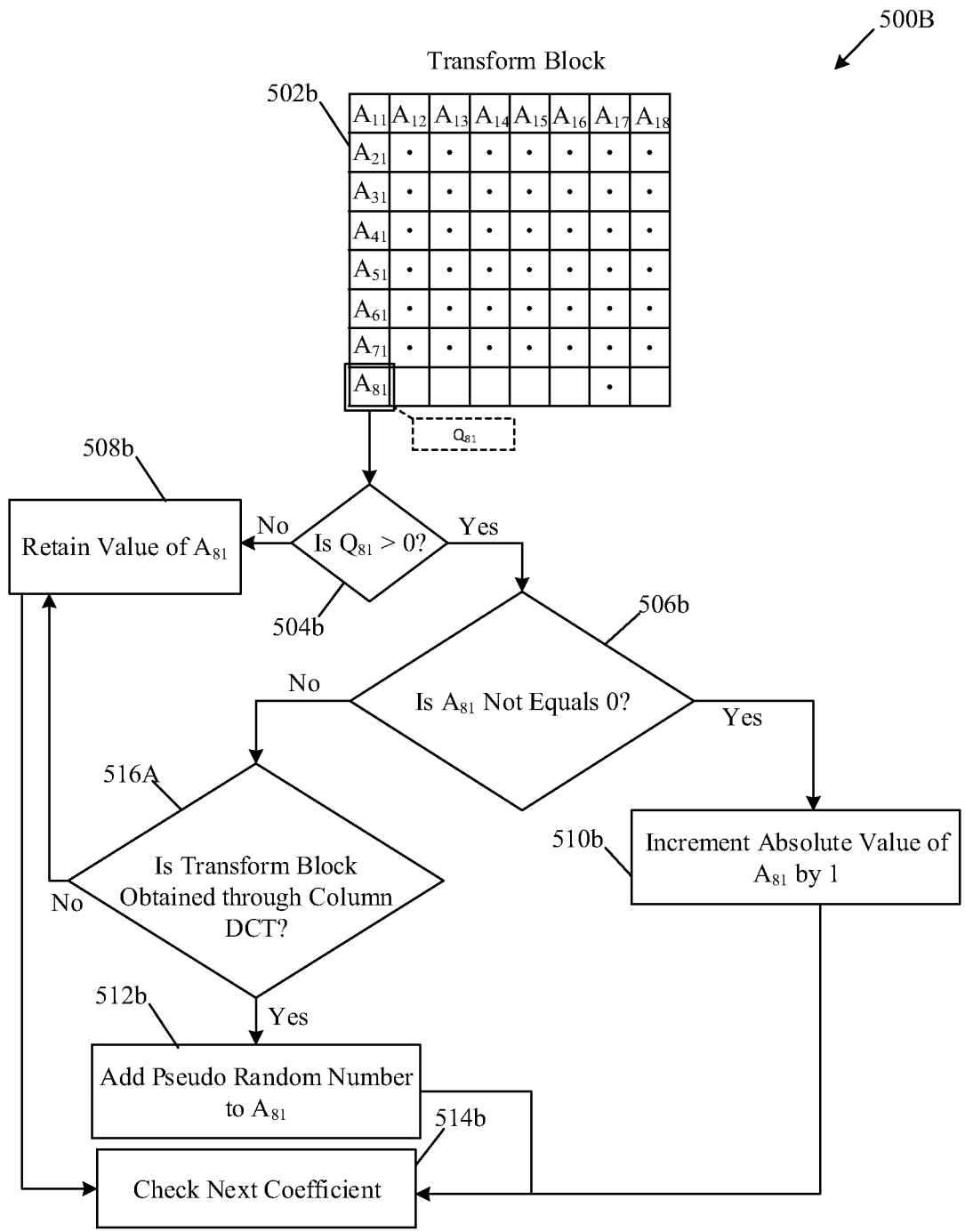
FIG. 5B is a decisional flow diagram that illustrates a second method for bias minimization with successive image reconstruction based on embedded codec circuitry, in accordance with an embodiment of the disclosure.

In accordance with another embodiment, the bias control circuit 212 may be further configured to determine a second condition associated with a transform coefficient (as further described, for example in FIG. 5B). The second condition may require a check on a quantization parameter, a value of the transform coefficient, and a type of transformation utilized for the transform block that includes the transform coefficient. In accordance with a second condition of the set of conditions, the bias control circuit 212 may be further configured to generate a pseudo random number for a transform coefficient when the transform coefficient is associated with a non-zero quantization parameter, an absolute value of the transform coefficient is zero, and the transform block that includes the transform coefficient is obtained through a specific type of transformation, for example, column-wise DCT of a patch of the input image. The information associated with the type of transformation utilized to generate the transform block may be present in the header of bit-stream of compressed image data and stored in the external memory 110 or the on-chip memory 204.

In accordance with yet another embodiment, the bias control circuit 212 may be configured to utilize the processor 108 to determine a third condition associated with a transform coefficient (as further described, for example in FIG. 5B). The third condition may require a check on a quantization parameter, a value of the transform coefficient, and a specific distribution pattern of transform coefficients in a transform block. The specific distribution pattern of transform coefficients may be checked in each transform block that includes a luma block and at least one chroma block of the encoded input image. Such luma block and at least one chroma block of the encoded input image may correspond to a patch of the input image. In accordance with a third condition of the set of conditions, the bias control circuit 212 may be configured to utilize the processor 108 to generate a pseudo random number for a transform coefficient. The pseudo random number may be generated when the transform coefficient is associated with a non-zero quantization parameter, an absolute value of the transform coefficient is zero, and at least one of a chroma block and a luma block associated with the transform coefficient exhibits a specific coefficient distribution pattern. For example, a specific coefficient distribution pattern may include the DCT coefficients of the luma block in the bottom row as zero-valued coefficients and other rows may have non-zero DCT coefficients.

The number of refinement bits be the empty or unassigned bit values within a bit budget for the transform block and may further vary with a binary representation of each transform block. Such variation may occur in a random or a pseudo random pattern (random in a sub-set of sample space). The number of refinement bits may vary further based on a specific bit budget for a specific transform block (or patch of an image) and a compression ratio associated with the block of such input image. For example, a block of "8×4" pixels may be encoded by a compression ratio of "2", i.e., for an input size of "8-bits per pixel" (Bpp) to an output size of "4 Bpp". The bit budget for the block of "8×4" pixels may be equal to "32 Pixels×4 Bpp", i.e., "128 Bits". Accordingly, the number of refinement bits may vary from "0" to "128 Bits" for the given bit budget for a block of pixels (or sample values).

In accordance with an embodiment, the pseudo random number may be generated based on a number of refinement bits available for the transform block. The least significant bit of the generated pseudo random number may be utilized to minimize a bias in successive reconstruction of the decoded images at the embedded decoder circuitry 106. In some embodiments, the pseudo random number may be a positive number when a number of refinement bits for the transform block is odd, and the pseudo random number may be a negative number when a number of refinement bits for the transform block is even. For example, for even number of refinement bits, the pseudo random number may be "−1" and the pseudo random number may be "1" for odd number of refinement bits and vice versa. The bias control circuit 212 may be further configured to utilize the processor 108 to modify a transform coefficient in a set of transform coefficients that may be selected for modification by the generated pseudo random number, in accordance with one of the first condition, second condition, and the third condition.

Similarly, the bias control circuit 212 may utilize the processor 108 to modify a transform coefficient based on application of increments on the transform coefficient, in accordance with the first condition, the second condition, and the third condition. Alternatively stated, the bias control circuit 212 may be configured to utilize the processor 108 to increment an absolute value of the transform coefficient by a specific value when the transform coefficient is associated with a non-zero quantization parameter and a non-zero value of the transform coefficient. Additionally, the bias control circuit 212 may further utilize the processor 108 to retain a sign value of each transform coefficient in the incremented transform coefficient that may be associated with a non-zero quantization parameter and a non-zero value of the transform coefficient. The modification by the pseudo random number or the increments may be iteratively executed on each successive transform coefficient in the set of transform coefficients that may be identified for modification from the plurality of transform coefficients in a transform block.

For example, a transform block (Ac) of size "4×8" may be given by (1):

$$A_C = \begin{bmatrix} 0 & 1 & -1 & 0 & 3 & 7 & 0 & -1 \\ 7 & -5 & -3 & 5 & 8 & 0 & 3 & -1 \\ 6 & 0 & 8 & -9 & 1 & 0 & 0 & -3 \\ 0 & 0 & 0 & 0 & -5 & 0 & -1 & 0 \end{bmatrix} \qquad (1)$$

In the first case, the quantization parameter for the transform block (Ac) may be fixed to a value of "7" from a range of "0 to 8" for a bit-depth of 8-bits associated with the bit-stream of compressed image data. The range of quantization parameter may be varied from 0 to a value of the bit depth of the bit-stream of compressed image data. In accordance with the first condition, the bias control circuit 212 may identify, using the processor 108, a set of transform coefficients in the transform block (Ac) that may require a modification. As the quantization parameter for the transform block (Ac) is greater than "0", all the transform coefficients (i.e. $A_{11} \ldots A_{48}$) may be selected for modification.

The bias control circuit 212 may be configured to identify a first set of coefficients that may be modified based on the pseudo random number and a second set of coefficients that may be modified based on application of increments to absolute value of the transform coefficients. Thus, the first set of coefficients may include $A_{11}, A_{14}, A_{17}, A_{26}, A_{32}, A_{36}, A_{37}, A_{41}, A_{42}, A_{43}, A_{44}, A_{46}$, and $A_{48}$ and the second set of coefficients may include all the coefficients except the first set of coefficients. The bias control circuit 212 may further to modify the set of transform coefficients identified for modification by the pseudo random number and the increments, to generate a modified transform block ($A_{MC}$). The modified transform block ($A_{MC}$) may be given by (2):

$$A_{MC} = \begin{bmatrix} 1 & 2 & -2 & -1 & 4 & 8 & -1 & -2 \\ 8 & -6 & -4 & 6 & 9 & 1 & 4 & -2 \\ 7 & 1 & 9 & -10 & 2 & -1 & 1 & -4 \\ -1 & 1 & 1 & 1 & -6 & 1 & -2 & 1 \end{bmatrix} \quad (2)$$

The bias control circuit 212 may be further configured to retain an actual value of the transform coefficient in the transform block without a modification or compensation for bias in the transform coefficient of a transform block. In one embodiment, the actual value of the transform coefficient may be retained when the transform coefficient is associated with a quantization parameter that either has a zero value, in accordance with of the first, second, or third condition. In another embodiment, the actual value of the transform coefficient may be retained when the transform block that includes the transform coefficient is not obtained through a specific type of transformation (for example, column DCT) and the quantization parameter is non-zero, in accordance with the second condition. In yet another embodiment, the actual value of the transform coefficient may be retained when at least one of a luma block or a chroma block of the transform block is not associated with a specific coefficient distribution pattern, in accordance with the third condition.

The bias control circuit 212 may be configured to output a modified transform-domain compressed data that may include a modified plurality of transform blocks. The modified plurality of transform blocks may be stored in the on-chip memory 204 and further transferred to the inverse transformer 214. The inverse transformer 214 may be configured to generate a plurality of pixel blocks such that each pixel block may include a plurality of pixels based on inverse transformation of each modified transform block of the encoded input image. The bias control circuit 212, in conjunction with the inverse transformer 214, may be further configured to generate a decoded image that may exhibit a reduced error propagation in successively reconstructed images with respect to the input image, based on inverse transformation of each transform block of the encoded input image. Alternatively stated, the bias control circuit 212 may be configured to utilize the processor 108, to generate a decoded image that may exhibit a minimum value of a peak signal to noise ratio (PSNR) in successively reconstructed images from the decoded image, with respect to the input image.

The bias control circuit 212 may be configured to compensate for a PSNR shift associated with successively reconstructed images based on the decoded image. The plurality of transform blocks obtained after the inverse quantization may be compensated based on the modification of the set of transform coefficients in each of the plurality of transform blocks. The PSNR shift may be compensated for each color block in a color space associated with the encoded image, for example, a chroma red block, a chroma blue block, and a luma block in YCbCr color space. The set of transform coefficients from the plurality of transform coefficients may be modified to minimize a PSNR shift in successively generated images based on the decoded image. The modification of the set of transform coefficients may correspond to a reconstruction of a transform block that corresponds to a patch of the input image.

In accordance with an embodiment, the decoded image may transferred to the decoded memory buffer, via the system bus 114. The decoded image buffer may store the decoded image temporarily to provide the decoded image for use by other circuitries, for example, video codecs that may utilize the decoded image to predict successive frames. In accordance with an embodiment, the video codec circuitry 112 may encode successive frames of a raw uncompressed video based on the utilization of the decoded image as a reference frame. As the decoded image exhibits a minimum PSNR shift, the successively reconstructed images that may be obtained in multiple generations of encoding or decoding may also exhibit a minimum PSNR shift or noticeable visual artifacts.

It may be noted that the bias control circuit 212 has been described as a part of the embedded decoder circuitry 106 to minimize bias at the decoder stage. However, the disclosure may not be so limited and the bias control circuit 212 may be implemented in the embedded encoder circuitry 104 or both circuitries of the embedded codec to minimize bias (or PSNR-shift) in successively reconstructed images.

Figure 3:
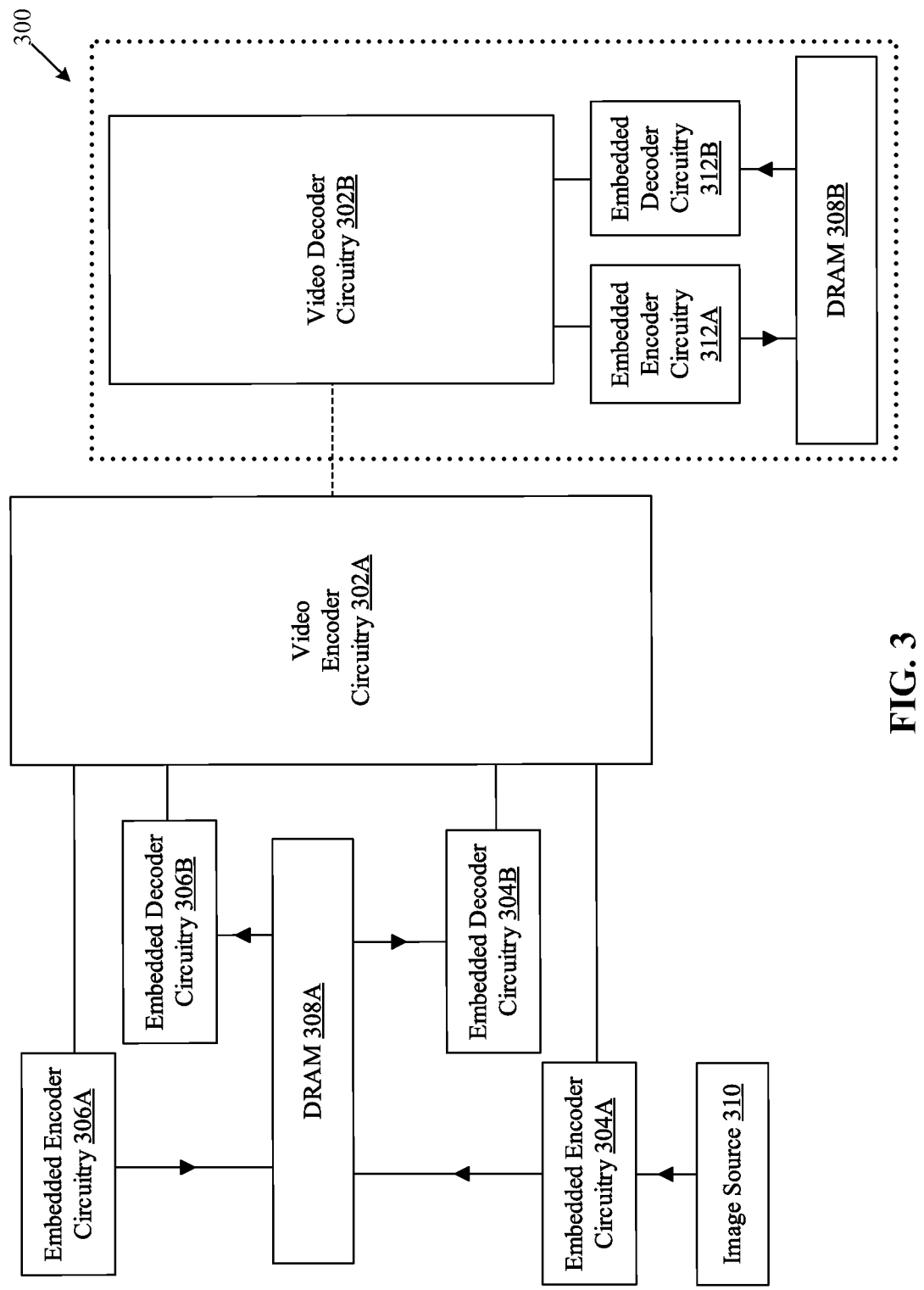
FIG. 3 is a block diagram that illustrates an architecture of a video codec circuitry that operates with a bias compensated embedded encoder circuitry and embedded decoder circuitry, in accordance with an embodiment of the disclosure.

FIG. 3 is a block diagram that illustrates an architecture of a video codec circuitry that operates with a bias compensated embedded encoder circuitry and embedded decoder circuitry, in accordance with an embodiment of the disclosure. FIG. 3 is explained in conjunction with FIG. 1 and FIG. 2. With reference to FIG. 3, there is shown a block diagram of an embedded-in-loop codec (EBC) architecture 300 of a video codec circuitry. The EBC architecture 300 may include a video encoder circuitry 302A that may be communicatively coupled to an embedded encoder circuitry 304A, an embedded decoder circuitry 304B, an embedded encoder circuitry 306A, and an embedded decoder circuitry 306B.

The embedded encoder circuitry 304A may be communicatively coupled to a DRAM 308A and further configured to receive an input image from an image source 310, encode the received input image by a specific compression ratio (for example, "2"), and store the encoded input image in the DRAM 308A. Similarly, the embedded decoder circuitry 304B may be communicatively coupled to the DRAM 308A and further configured to decode the stored encoded input image in the DRAM 308A and provide the decoded image after minimization of bias (or PSNR-shift) to the video encoder circuitry 302A. In one implementation, the embedded encoder circuitry may sequentially receive a set of input images, which may be referred as a set of reference frames (for example, "16" reference frames) required for the video encoder circuitry 302A to encode raw uncompressed video data. The embedded decoder circuitry 304B may be configured to minimize a bias in the decoding stage of image refinement and reconstruction to generate a bias compensated decoded image that may cause a minimum bias in successively reconstructed images generated at the video encoder circuitry 302A.

Similarly, the EBC architecture 300 may further include a video decoder circuitry 302B that may be communicatively coupled to an embedded encoder circuitry 312A and an embedded decoder circuitry 312B. The video decoder circuitry 302B may be present along with the video encoder circuitry 302A in the same media device or the video encoder circuitry 302A may be present on a media device different from a media device that has the video decoder circuitry 302B. The video decoder circuitry 302B may issue a request to the embedded decoder circuitry 312B communicatively coupled to a DRAM 308B, to decode a bit-stream of compressed image data and provide the decoded image to the video decoder circuitry 302B. Accordingly, the video decoder circuitry 302B may iteratively request the embedded encoder circuitry 310A or the embedded decoder circuitry 3108 to encode or decode image data, with further application of suitable bias compensation (or PSNR-shift compensation).

Figure 4A:
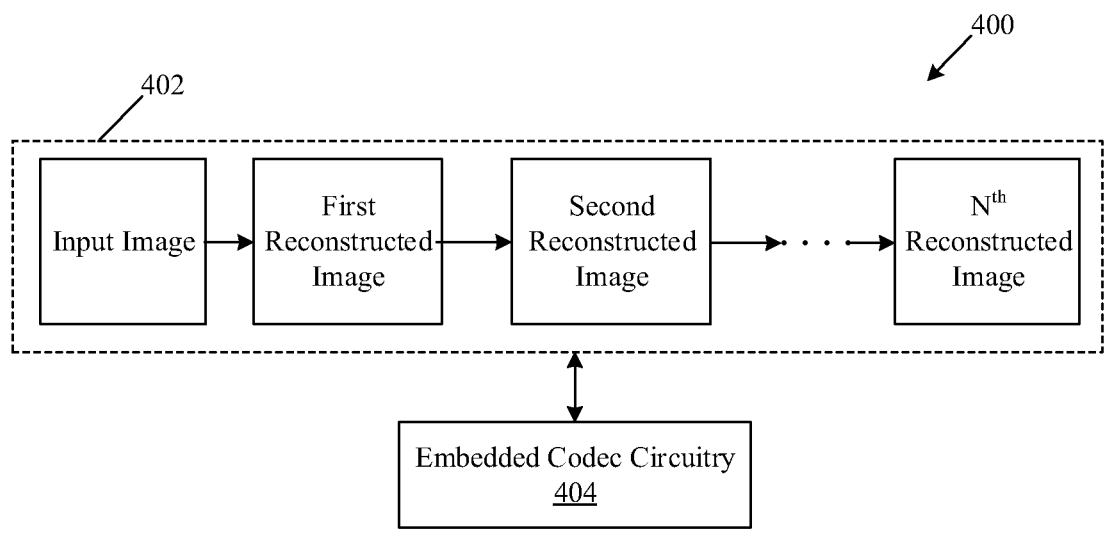
FIG. 4A is a block diagram that illustrates different successively reconstructed images generated based on an input image and a decoded image using the embedded codec circuitry, in accordance with an embodiment of the disclosure.

FIG. 4A is a block diagram that illustrates different successively reconstructed images generated based on the input image and the decoded image using the embedded codec circuitry, in accordance with an embodiment of the disclosure. FIG. 4A is explained in conjunction with elements from FIGS. 1, 2, and 3. With reference to FIG. 4A, there is shown a block diagram 400 of a sequence of images 402 obtained in multiple generations of encoding/decoding at the embedded codec circuitry 404.

The sequence of images 402 may include an input image which may be a raw image (in YCrCb color space) and followed by a chain of reconstructed images that may include a first reconstructed image, a second reconstructed image, . . . , and an Nth reconstructed image. Each reconstructed image may be obtained using the embedded codec circuitry 404 based on a previous image in the sequence of images 402. Thus, if the first reconstructed image is a lossy image that includes some bias (or PSNR-shift) caused at the encoder end of the embedded codec circuitry 404, then the second reconstructed image may still include the bias from the first reconstructed image and additional bias that may be caused by a successive decoding based on the first reconstructed image.

The bias (or PSNR-shift) may increase with an increase in index of the reconstructed image in the sequence of images. Alternatively stated, the Nth reconstructed image may exhibit a maximum bias (or PSNR shift) of the sequence of images. Therefore, the embedded codec circuitry 404 may be configured to minimize the bias that may be caused in successive generations of encoding/decoding at the embedded codec circuitry 404. The bias may be minimized based on determination of a set of conditions on transform domain data that may be obtained after inverse quantization of the bit-stream of compressed image data (of the input image). Thereafter, the embedded codec circuitry 404 may be further configured to modify the transform coefficients in the transform domain data based on the determination of the set of conditions. The modification of the transform coefficient may advantageously minimize the bias (or PSNR shift) and compensate for a degradation in the visual quality associated with successive encoding/decoding of the input image.

Figure 4B:
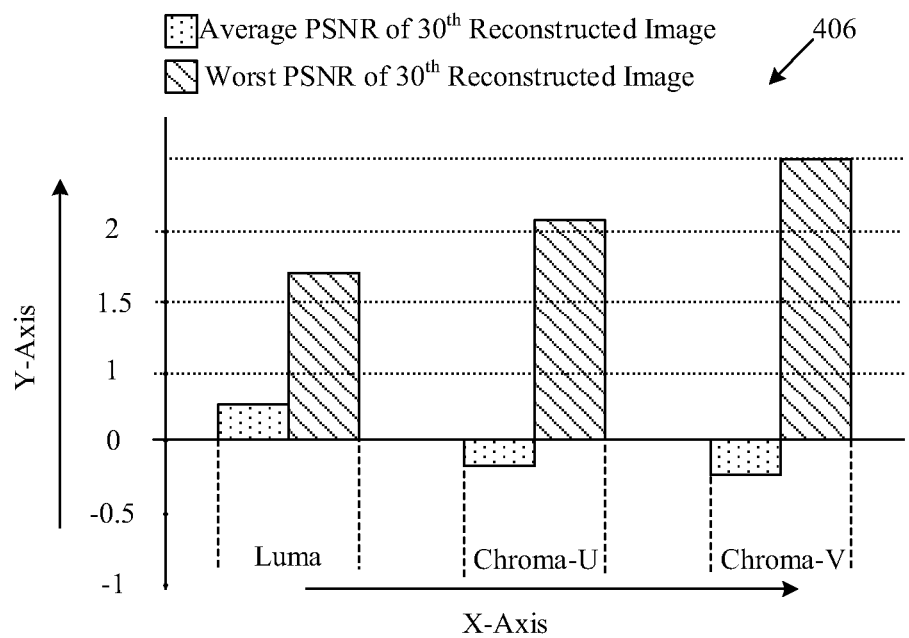
FIG. 4B is a bar chart that illustrates a variation in average peak signal to noise ratio (PSNR) for an exemplary $30^{th}$ reconstructed image with respect to different parameters of color space of the $30^{th}$ reconstructed image, in accordance with an embodiment of the disclosure.

FIG. 4B is a bar chart that illustrates a variation in average peak signal to noise ratio (PSNR) for $30^{th}$ reconstructed image with respect to different parameters of color space of the $30^{th}$ reconstructed image, in accordance with an embodiment of the disclosure. FIG. 4B is explained in conjunction with elements from FIGS. 1, 2, 3, and 4A. With reference to FIG. 4B, there is shown a bar chart 406 that describes a variation in average peak signal to noise ratio (PSNR) for the $30^{th}$ reconstructed image with respect to different parameters of color space of the $30^{th}$ reconstructed image.

The bar chart 406 describes PSNR values (in decibels) along Y-axis and different parameters of the YCbCr color space along the X-axis. Along the X-axis, an average PSNR value for different parameters of the $30^{th}$ reconstructed image is compared with a worst PSNR value for the same parameters of the $30^{th}$ reconstructed image. As shown, the average PSNR value (0.24 dB) for the luma parameter is greater than the worst PSNR value (1.23 dB) for the luma parameter. As further shown, the average PSNR value (−0.21 dB) for the chroma-U parameter is greater than the worst PSNR value (1.55 dB) for the chroma-U parameter. Similarly, as further shown, the average PSNR value (−0.27 dB) for the chroma-V parameter is greater than the worst PSNR value (2.19 dB) for the chroma-V parameter.

FIG. 5A is a decisional flow diagram that illustrates a first method for bias minimization with successive image reconstruction within embedded codec circuitry, in accordance with an embodiment of the disclosure. FIG. 5A is explained in conjunction with elements from FIG. 1, FIG. 2, FIG. 3, FIG. 4A, and FIG. 4B. With reference to FIG. 5A, there is shown a decisional flow diagram 500A that includes a transform block 502a stored in the on-chip memory 204 of the embedded decoder circuitry 106. The transform block 502a may include a plurality of transform coefficients, for example, a plurality of DCT coefficients ($A_{11}$ . . . $A_{88}$). At least one transform coefficients may be associated with a specific quantization parameter, for example, $Q_{81}$. The embedded decoder circuitry 106 may be configured to determine a set of conditions associated with a transform coefficient in the transform block and further modify a set of transform coefficients from the plurality of transform coefficients based on the determination of the set of conditions. The modification of transform coefficients based on the set of conditions may advantageously facilitate minimization of bias (or PSNR shift) in successive generations of encoding/decoding of the input image that includes the transform block 502a. As shown in FIG. 5A, the first condition is illustrated and described herein for a single transform coefficient $A_{81}$ associated with a quantization parameter $Q_{81}$ in the transform block 502a. The flow diagram spans from 504a to 514a and recursively iterates for every transform coefficient.

At 504a, it is determined whether the quantization parameter ($Q_{81}$) is greater than zero. In one instance, when the quantization parameter ($Q_{81}$) is greater than zero, control passes to 506a. In another instance, when the quantization parameter ($Q_{81}$) is not greater than zero, control passes to 508a. The embedded decoder circuitry 106 may be configured to determine whether the quantization parameter ($Q_{81}$) is greater than zero.

At 506a, it is determined whether the transform coefficient ($A_{81}$) is not equal to zero. In one instance, when the transform coefficient ($A_{81}$) is not equal to zero, control passes to 510a. In another instance, when the transform coefficient ($A_{81}$) is equal to zero, control passes to 512a. The embedded decoder circuitry 106 may be configured to determine whether the transform coefficient ($A_{81}$) is not equal to zero.

At 508a, the value of the transform coefficient ($A_{81}$) is retained without a modification in the value of the transform coefficient. The embedded decoder circuitry 106 may be configured to retain the value of the transform coefficient ($A_{81}$) without a modification in the value of the transform coefficient.

At 510a, the absolute value of the transform coefficient $A_{81}$ may be incremented by 1. Similarly, the sign of the transform coefficient ($A_{81}$) may be retained. For example, for "$A_{81}$=−3", modified "$A_{81}$=−(3+1)=−4". The embedded decoder circuitry 106 may be configured to modify the absolute value of the transform coefficient ($A_{81}$) based on an increment of 1.

At 512a, a pseudo random number may be added to the transform coefficient ($A_{81}$). In one case, the pseudo random number may be generated between −1 and 1 randomly based on a number of refinement bits for the transform block 502a. The embedded decoder circuitry 106 may be configured to add a pseudo random number to the transform coefficient ($A_{81}$).

At 514a, next transform coefficient in the transform block 502a may be checked for the first condition. The embedded decoder circuitry 106 may be configured to check the next transform coefficient in the transform block 502a. Control progresses recursively until the end of the transform block 502a and thereafter, a next transform block may be selected.

FIG. 5B is a decisional flow diagram that illustrates a second method for bias minimization with successive image reconstruction within embedded codec circuitry, in accordance with an embodiment of the disclosure. FIG. 5B is explained in conjunction with elements from FIG. 1, FIG. 2, FIG. 3, FIG. 4A, FIG. 4B, and FIG. 5A. With reference to FIG. 5B, there is shown a decisional flow diagram 500B that includes a transform block 502b stored in the on-chip memory 204 of the embedded decoder circuitry 106. The transform block 502b may include a plurality of transform coefficients, for example, a plurality of DCT coefficients ($A_{11} \ldots A_{88}$). At least one transform coefficient may be associated with a specific quantization parameter, for example, $Q_{81}$. The embedded decoder circuitry 106 may be configured to determine a set of conditions associated with a transform coefficient in the transform block and further modify a set of transform coefficients from the plurality of transform coefficients based on the determination of the set of conditions. The modification of transform coefficients based on the set of conditions may advantageously facilitate minimization of bias (or PSNR shift) in successive generations of encoding/decoding of the input image that includes the transform block 502b. As shown in FIG. 5B, the second condition is illustrated and described herein for a single transform coefficient $A_{81}$ associated with a quantization parameter $Q_{81}$ in the transform block 502b. The flow diagram spans from 504b to 518a recursively iterates for every transform coefficient.

At 504b, it is determined whether the quantization parameter ($Q_{81}$) is greater than zero. In one instance, when the quantization parameter ($Q_{81}$) is greater than zero, control passes to 506b. In another instance, when the quantization parameter ($Q_{81}$) is not greater than zero, control passes to 508b. The embedded decoder circuitry 106 may be configured to determine whether the quantization parameter ($Q_{81}$) is greater than zero.

At 506b, it is determined whether the transform coefficient ($A_{81}$) is not equal to zero. In one instance, when the transform coefficient ($A_{81}$) is not equal to zero, control passes to 510b. In another instance, when the transform coefficient ($A_{81}$) is equal to zero, control passes to 516A. The embedded decoder circuitry 106 may be configured to determine whether the transform coefficient ($A_{81}$) is not equal to zero.

At 508b, the value of the transform coefficient ($A_{81}$) is retained without a modification in the value of the transform coefficient. The embedded decoder circuitry 106 may be configured to retain the value of the transform coefficient ($A_{81}$) without a modification in the value of the transform coefficient.

At 510b, the absolute value of the transform coefficient $A_{81}$ may be incremented by 1. Similarly, the sign of the transform coefficient ($A_{81}$) may be retained. For example, for "$A_{81}$=−3", modified "$A_{81}$=−(3+1)=−4". The embedded decoder circuitry 106 may be configured to modify the absolute value of the transform coefficient ($A_{81}$) based on an increment of 1.

At 512b, a pseudo random number may be added to the transform coefficient ($A_{81}$). In one case, the pseudo random number may be generated between −1 and 1 randomly based on a number of refinement bits for the transform block 502b. The embedded decoder circuitry 106 may be configured to add a pseudo random number to the transform coefficient ($A_{81}$).

At 514b, next transform coefficient in the transform block 502b may be checked for the first condition. The embedded decoder circuitry 106 may be configured to check the next transform coefficient in the transform block 502b. Control progresses recursively until the end of the transform block 502b, and thereafter, a next transform block may be selected.

At 516A, it is determined whether the transform block 502b is obtained through column DCT. In one instance, when the transform block 502b is obtained through column DCT, control passes to 512b. In another instance, when the transform block 502b is not obtained through column DCT, control passes to 514b. The embedded decoder circuitry 106 may be configured to determine whether the transform block 502b is obtained through column DCT.

Figure 5C:
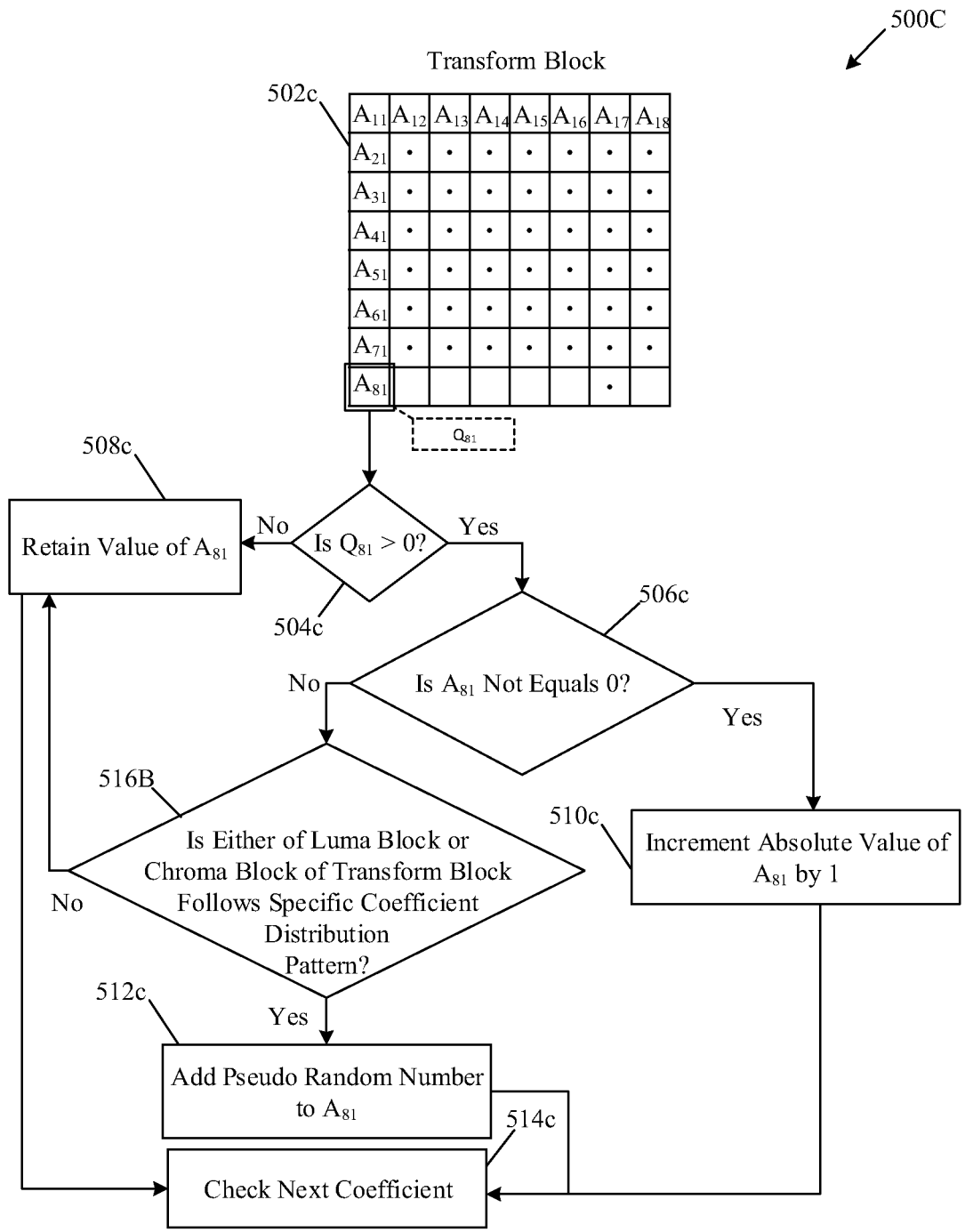
FIG. 5C is a decisional flow diagram that illustrates a third method for bias minimization with successive image reconstruction based on embedded codec circuitry, in accordance with an embodiment of the disclosure.

FIG. 5C is a decisional flow diagram that illustrates a third method for bias minimization with successive image reconstruction based on embedded codec circuitry, in accordance with yet another embodiment of the disclosure. FIG. 5C is explained in conjunction with elements from FIG. 1, FIG. 2, FIG. 3, FIG. 4A, FIG. 4B, FIG. 5A, and FIG. 5B. With reference to FIG. 5C, there is shown a decisional flow diagram 500C that includes a transform block 502c stored in the on-chip memory 204 of the embedded decoder circuitry 106. The transform block 502c may include a plurality of transform coefficients, for example, a plurality of DCT coefficients ($A_{11} \ldots A_{88}$). At least one transform coefficients may be associated with a specific quantization parameter, for example, $Q_{81}$. The embedded decoder circuitry 106 may be configured to determine a set of conditions associated with a transform coefficient in the transform block and further modify a set of transform coefficients from the plurality of transform coefficients based on the determination of the set of conditions. The modification of transform coefficients based on the set of conditions may advantageously facilitate minimization of bias (or PSNR shift) in successive generations of encoding/decoding of the input image that includes the transform block 502c. As shown in FIG. 5B, the third condition is illustrated and described herein for a single transform coefficient $A_{81}$ associated with a quantization parameter $Q_{81}$ in the transform block 502c. The flow diagram spans from 504c to 518b and recursively iterates for every transform coefficient.

At 504c, it is determined whether the quantization parameter ($Q_{81}$) is greater than zero. In one instance, when the quantization parameter ($Q_{81}$) is greater than zero, control passes to 506c. In another instance, when the quantization parameter ($Q_{81}$) is not greater than zero, control passes to 508c. The embedded decoder circuitry 106 may be configured to determine whether the quantization parameter ($Q_{81}$) is greater than zero.

At 506c, it is determined whether the transform coefficient ($A_{81}$) is not equal to zero. In one instance, when the transform coefficient ($A_{81}$) is not equal to zero, control passes to 510c. In another instance, when the transform coefficient ($A_{81}$) is equal to zero, control passes to 516B. The embedded decoder circuitry 106 may be configured to determine whether the transform coefficient ($A_{81}$) is not equal to zero.

At 508c, the value of the transform coefficient ($A_{81}$) is retained without a modification in the value of the transform coefficient. The embedded decoder circuitry 106 may be configured to retain the value of the transform coefficient ($A_{81}$) without a modification in the value of the transform coefficient.

At 510c, the absolute value of the transform coefficient $A_{81}$ may be incremented by 1. Similarly, the sign of the transform coefficient ($A_{81}$) may be retained. For example, for "$A_{81}=-3$", modified "$A_{81}=-(3+1)=-4$". The embedded decoder circuitry 106 may be configured to modify the absolute value of the transform coefficient ($A_{81}$) based on an increment of 1.

At 512c, a pseudo random number may be added to the transform coefficient ($A_{81}$). In one case, the pseudo random number may be generated between −1 and 1 randomly based on a number of refinement bits for the transform block 502c. The embedded decoder circuitry 106 may be configured to add a pseudo random number to the transform coefficient ($A_{81}$).

At 514c, next transform coefficient in the transform block 502c may be checked for the first condition. The embedded decoder circuitry 106 may be configured to check the next transform coefficient in the transform block 502c. Control progresses recursively until the end of the transform block 502c, and thereafter, a next transform block may be selected.

At 516B, it is determined whether either of luma block or chroma block of the transform block 502c follows a specific coefficient distribution pattern. In one instance, when either of the luma block or the chroma block of the transform block 502c follows a specific coefficient distribution pattern, control passes to 512c. In another instance, when either of the luma block or the chroma block of the transform block 502c doesn't follow a specific coefficient distribution pattern, control passes to 514c. The embedded decoder circuitry 106 may be configured to determine whether either of the luma block or the chroma block of the transform block 502c follows a specific coefficient distribution pattern.

Figure 6:
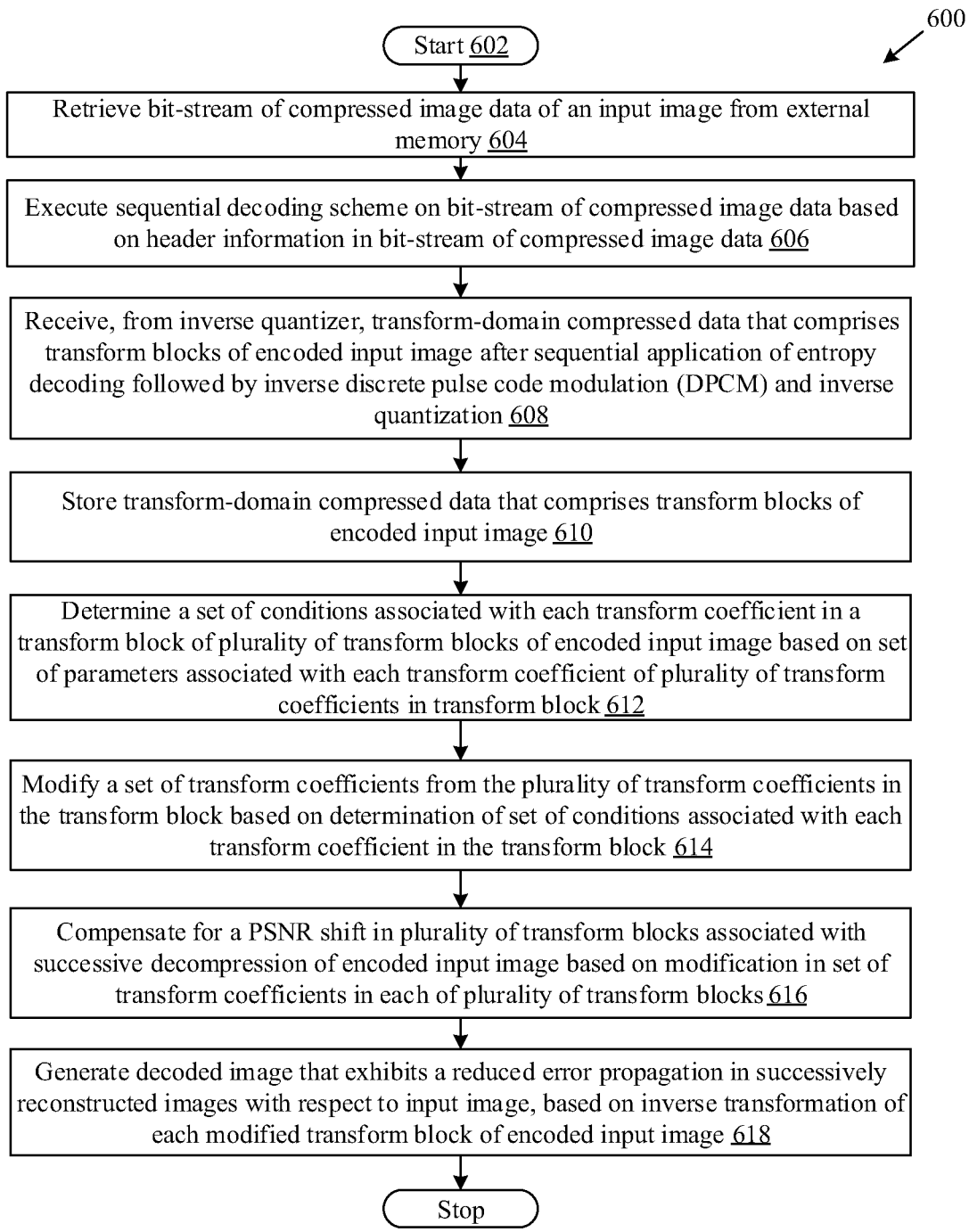
FIG. 6 is a flow chart that illustrates an exemplary method for bias minimization with successive image reconstruction based on embedded codec circuitry, in accordance with an embodiment of the disclosure.

FIG. 6 is a flow chart that illustrates an exemplary method for bias minimization with successive image reconstruction based on embedded codec circuitry, in accordance with an embodiment of the disclosure. FIG. 6 is explained in conjunction with elements from FIG. 1, FIG. 2, FIG. 3, FIG. 4A, FIG. 4B, FIG. 5A, FIG. 5B, and FIG. 5C. With reference to FIG. 6, there is shown a flowchart 600. The method starts at 602 and proceeds to step 604.

At 604, a bit-stream of compressed image data of an input image may be retrieved from the external memory 110 (for example, a DRAM). The embedded decoder circuitry 106 may utilize, the I/O interface 202, to retrieve the bit-stream of compressed image data of an input image from the external memory 110. The bit-stream of compressed image data may include a header and associated data in packets, with each packet including a set of entropy encoded code words.

At 606, a sequential decoding scheme may be further executed on the retrieved bit-stream of compressed image data based on header information in the bit-stream of compressed image data. The embedded decoder circuitry 106 may be configured to execute the sequential decoding scheme on the retrieved bit-stream of compressed image data based on header information in the bit-stream of compressed image data.

At 608, transform domain compressed data that may include transform blocks of encoded input image may be further received from the inverse quantizer 210 after sequential application entropy decoding followed by inverse discrete pulse code modulation (DPCM) and inverse quantization. The bias control circuit 212 may be configured to receive transform-domain compressed data from the inverse quantizer 210 after sequential application of sequential application of entropy decoding followed by inverse discrete pulse code modulation (DPCM) and inverse quantization. The transform-domain compressed data may include a plurality of transform blocks of the encoded input image.

At 610, transform-domain compressed data that may include the plurality of transform blocks of the input image may be stored. The I/O interface 202 may be configured to facilitate the storage of the transform domain compressed data that may include the plurality of transform blocks of the input image in the on-chip memory 204.

At 612, a set of conditions associated with each transform coefficient in a transform block of plurality of transform blocks of the encoded input image may be determined based on a set of parameters associated with each transform coefficient of plurality of transform coefficients in transform block. The bias control circuit 212 may be configured to determine a set of conditions associated with each transform coefficient in a transform block of plurality of transform blocks of the encoded input image. The set of conditions may be determined based on a set of parameters associated with each transform coefficient of plurality of transform coefficients in transform block.

At 614, a set of transform coefficients from the plurality of transform coefficients in the transform block may be modified based on determination of the set of conditions associated with each transform coefficient in the transform block. The bias control circuit 212 may be configured to modify the set of transform coefficients from the plurality of transform coefficients in the transform block. Such modifications may be done based on determination of the set of conditions associated with each transform coefficient in the transform block. Such modifications of the transform coefficients may further depend on the quantization parameter associated with the transform blocks processed at the embedded decoder circuitry 106 or the embedded encoder circuitry 104.

At 616, a PSNR shift in the plurality of transform blocks associated with successively reconstructed images from a decoded image may be compensated based on modification in a set of transform coefficients in each of plurality of transform blocks. The bias control circuit 212 may be configured to compensate for the PSNR shift in the plurality of transform blocks associated with successive decompression of the encoded input image based on modification in the set of transform coefficients in each of plurality of transform blocks.

At 618, a decoded image may be generated that may exhibit that may exhibit a reduced error propagation in successively reconstructed images with respect to the input image. The bias control circuit 212 may be configured to generate the decoded image that may exhibit a reduced error propagation in successively reconstructed images with respect to the input image, based on inverse transformation of each transform block of the encoded input image. Alternatively stated, the bias control circuit 212, in conjunction with the inverse transformer 214, may be configured to generate the decoded image that may exhibit a minimum value of peak signal to noise ratio (PSNR) in successively reconstructed images from the decoded image with respect to input image. Control passes to end.

Certain embodiments of the disclosure may be found in an embedded decoder circuitry. Various embodiments of the disclosure may provide the embedded decoder circuitry that may include an on-chip memory and a bias control circuit communicatively coupled to the on-chip memory. The on-chip memory may be configured to store transform domain compressed data that may include a plurality of transform blocks of an input image encoded by an embedded encoder circuitry. The bias control circuit may be configured to determine a set of conditions associated with each transform coefficient in a transform block of the plurality of transform blocks of the encoded input image. The set of conditions may be determined based on a set of parameters associated with each transform coefficient of a plurality of transform coefficients in the transform block. The bias control circuit may be further configured to modify a set of transform coefficients from the plurality of transform coefficients in the transform block. Such modifications of the set of transform coefficients may be done based on determination of the set of conditions associated with each transform coefficient in the transform block. The set of transform coefficients may be modified to compensate for a bias generated in successive generations of the encoding/decoding of the input image. The bias control circuit may be further configured to generate, in conjunction with the inverse transformer, a decoded image that may exhibit a minimum value of a peak signal to noise ratio (PSNR) in successively reconstructed images from the decoded image, with respect to the input image. The decoded image may be generated based on an inverse transformation of each transform block of the encoded input image.

In accordance with an embodiment, the bias control circuit may be further configured to execute a sequential decoding scheme on a bit-stream of compressed image data of the encoded input image. Such sequential encoding scheme may be executed based on header information in the bit-stream of the compressed image data. The sequential decoding scheme may further include a sequential application of entropy decoding followed by inverse discrete pulse code modulation (DPCM), inverse quantization, and inverse transformation. The header information may further indicate a sequential encoding scheme applied at encoding of a plurality of patches of the input image. The sequential encoding scheme may be applied to obtain the bit-stream of compressed image data of the encoded input image.

In accordance with an embodiment, the bias control circuit may be further configured to receive, from an inverse quantizer, the transform domain compressed data that may include the plurality of transform blocks of the encoded input image after sequential application of sequential application of entropy decoding followed by inverse discrete pulse code modulation (DPCM) and inverse quantization. Each transform block may include a luma block and at least one chroma block of an encoded input image that corresponds to a patch of the input image.

In accordance with an embodiment, the bias control circuit may be further configured to modify the set of transform coefficients for image reconstruction and bias removal in successive generations of the encoded input image, after the inverse quantization and before the inverse transform in the sequential decoding scheme. The set of transform coefficients from the plurality of transform coefficients may be modified to minimize a PSNR shift in successively reconstructed images generated from a decoded image (decoded from an encoded input image). The modification of the set of transform coefficients may correspond to a reconstruction of a transform block that corresponds to a patch of the input image.

In accordance with an embodiment, the set of transform coefficients may correspond to coefficient values that require a modification for a bias minimization and image refinement in successive generations of the input image. The set of parameters associated with each transform coefficient may include a quantization parameter, an absolute value of a transform coefficient, a transform type for the transform block, a specific coefficient distribution pattern of a luma block and at least one chroma block.

In accordance with an embodiment, the bias control circuit may be further configured to generate a pseudo random number for a transform coefficient that is associated with a non-zero quantization parameter for the transform coefficient and an absolute value of the transform coefficient is zero, in accordance with a first condition of the set of conditions. The pseudo random number may be generated based on a number of refinement bits for the transform block. The pseudo random number may be a positive number when a number of refinement bits for the transform block is odd, and the pseudo random number may be a negative number when a number of refinement bits for the transform block is even.

In accordance with an embodiment, the bias control circuit may be further configured to generate a pseudo random number for a transform coefficient. Such pseudo random number may be generated when the transform coefficient is associated with a non-zero quantization parameter, an absolute value of the transform coefficient is zero, and the transform block that includes the transform coefficient is obtained through column wise Discrete Cosine Transformation (DCT) of a patch of the input image, in accordance with a second condition of the set of conditions.

In accordance with an embodiment, the bias control circuit may be further configured to generate a pseudo random number. Such pseudo random number may be generated for a transform coefficient when the transform coefficient is associated with a non-zero quantization parameter, an absolute value of the transform coefficient is zero, and at least one of a chroma block and a luma block associated with the transform coefficient exhibits a specific coefficient distribution pattern, in accordance with a third condition of the set of conditions. The modification of the transform coefficient may be done based on the generated pseudo random number, which may be generated from the number of available refinement bits to decode the transform block.

In accordance with an embodiment, the bias control circuit may be further configured to increment an absolute value of the transform coefficient by a specific value when the transform coefficient is associated with a non-zero quantization parameter and a non-zero value of the transform coefficient. The bias control circuit may further retain a sign value of each transform coefficient in the incremented transform coefficient that is associated with a non-zero quantization parameter and a non-zero value of the transform coefficient.

In accordance with an embodiment, the bias control circuit may be further configured to compensate for a PSNR shift in the plurality of transform blocks associated with successive decompression of the encoded input image. Such compensation may be done based on the modification in the set of transform coefficients in each of the plurality of transform blocks. The PSNR shift may be compensated for each color block in a color space associated with the encoded input image.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded decoder circuitry, comprising:
a memory configured to store transform-domain compressed data that comprises a plurality of transform blocks of an input image encoded by an embedded encoder circuitry; and
a bias control circuit communicatively coupled to the memory, wherein the bias control circuit is configured to:
determine a set of conditions for each transform coefficient of a plurality of transform coefficients in each transform block of the plurality of transform blocks based on a set of parameters associated with each transform coefficient, wherein
the set of condition includes a first condition,
for the first condition,
a transform coefficient of the plurality of transform coefficients in a specific transform block of the plurality of transform blocks is associated with a non-zero quantization parameter, and
an absolute value of the transform coefficient is zero;
modify a set of transform coefficients from the plurality of transform coefficients in each transform block based on the determined set of conditions associated with each transform coefficient;
generate a plurality of modified transform blocks based on the modification of the set of transform coefficients in each transform block;
generate a decoded image based on inverse transformation of each modified transform block of the plurality of modified transform blocks of the encoded input image, wherein
the decoded image exhibits a minimum value of peak signal to noise ratio (PSNR) in successively reconstructed images with respect to the input image; and
compensate for a bias in the successively reconstructed images, wherein the bias is compensated based on the decoded image.

2. The embedded decoder circuitry according to claim 1, wherein the bias control circuit is further configured to execute a sequential decoding scheme on a bit-stream of compressed image data of the encoded input image based on header information in the bit-stream of compressed image data.

3. The embedded decoder circuitry according to claim 2, wherein
the header information indicates application of a sequential encoding scheme at encoding of a plurality of patches of the input image to obtain the bit-stream of compressed image data of the encoded input image, and
the sequential decoding scheme includes a sequential application of entropy decoding followed by inverse discrete pulse code modulation (DPCM), inverse quantization, and inverse transformation.

4. The embedded decoder circuitry according to claim 3, wherein the bias control circuit is further configured to:
modify the set of transform coefficients for reconstruction of the input image; and
compensate for the bias in the successively reconstructed images, wherein the bias is compensated after an inverse quantization and before an inverse transform in the sequential decoding scheme.

5. The embedded decoder circuitry according to claim 1, wherein the bias control circuit is further configured to receive, from an inverse quantizer (IQ), the transform-domain compressed data after sequential application of entropy decoding followed by inverse discrete pulse code modulation (DPCM) and inverse quantization.

6. The embedded decoder circuitry according to claim 1, wherein each transform block comprises a luma block and at least one chroma block of the encoded input image, wherein each transform block corresponds to a patch of the input image.

7. The embedded decoder circuitry according to claim 1, wherein the bias control circuit is further configured to minimize a PSNR shift in the successively reconstructed images based on the modification of the set of transform coefficients.

8. The embedded decoder circuitry according to claim 1, wherein the modification of the set of transform coefficients corresponds to a reconstruction of the specific transform block that corresponds to a patch of the input image.

9. The embedded decoder circuitry according to claim 1, wherein the set of transform coefficients corresponds to coefficient values that require a modification for a bias minimization and image refinement in the successively reconstructed images.

10. The embedded decoder circuitry according to claim 1, wherein the set of parameters associated with each transform coefficient comprises at least one of a quantization parameter, the absolute value of the transform coefficient, a transform type for the specific transform block, or a specific coefficient distribution pattern of a luma block and at least one chroma block.

11. The embedded decoder circuitry according to claim 1, wherein
the bias control circuit is further configured to generate a pseudo random number for the transform coefficient based on the first condition.

12. The embedded decoder circuitry according to claim 11, wherein the pseudo random number is generated based on a number of refinement bits for the specific transform block.

13. The embedded decoder circuitry according to claim 11, wherein the pseudo random number is a positive number when a number of refinement bits for the specific transform block is odd, and wherein the pseudo random number is a negative number when the number of refinement bits for the specific transform block is even.

14. The embedded decoder circuitry according to claim 1, wherein
the set of conditions further includes a second condition, for the second condition,
the transform coefficient is associated with the non-zero quantization parameter,
the absolute value of the transform coefficient is zero, and
the specific transform block that includes the transform coefficient is obtained through column Discrete Cosine Transformation (DCT) of a patch of the input image, and
the bias control circuit is further configured to generate a pseudo random number for the transform coefficient based on the second condition.

15. The embedded decoder circuitry according to claim 1, wherein
the set of conditions further includes a third condition, in the third condition,
the transform coefficient is associated with the non-zero quantization parameter,
the absolute value of the transform coefficient is zero, and
at least one of a chroma block and a luma block associated with the transform coefficient exhibits a specific coefficient distribution pattern, and
the bias control circuit is further configured to generate a pseudo random number for the transform coefficient based on the third condition.

16. The embedded decoder circuitry according to claim 1, wherein the modification of the set of transform coefficients is based on a pseudo random number associated with the set of transform coefficients.

17. The embedded decoder circuitry according to claim 1, wherein the bias control circuit is further configured to increment the absolute value of the transform coefficient by a specific value when the transform coefficient is associated with the non-zero quantization parameter and the absolute value of the transform coefficient is a non-zero value.

18. The embedded decoder circuitry according to claim 17, wherein the bias control circuit is further configured to retain a sign value of the transform coefficient in the incremented transform coefficient.

19. The embedded decoder circuitry according to claim 1, wherein
the bias control circuit is further configured to compensate for a PSNR shift in the plurality of transform blocks associated with successive decompression of the encoded input image based on the modification of the set of transform coefficients in each of the plurality of transform blocks, and
the PSNR shift is compensated for each color block in a color space associated with the encoded input image.

20. A method, comprising:
in an embedded decoder circuitry that comprises a memory configured to store transform-domain compressed data and a bias control circuit communicatively coupled to the memory, wherein the transform-domain compressed data comprises a plurality of transform blocks of an input image encoded by an embedded encoder circuitry:
determining, by the bias control circuit, a set of conditions for each transform coefficient of a plurality of transform coefficients in each transform block of the plurality of transform blocks based on a set of parameters associated with each transform coefficient, wherein
the set of condition includes a first condition,
in the first condition,
a transform coefficient of the plurality of transform coefficients in a specific transform block of the plurality of transform blocks is associated with a non-zero quantization parameter, and
an absolute value of the transform coefficient is zero;
modifying, by the bias control circuit, a set of transform coefficients from the plurality of transform coefficients in each transform block based on the determined set of conditions associated with each transform coefficient,
generating, by the bias control circuit, a plurality of modified transform blocks based on the modification of the set of transform coefficients in each transform block;
generating, by the bias control circuit, a decoded image based on inverse transformation of each modified transform block of the plurality of modified transform blocks of the encoded input image, wherein
the decoded image exhibits a minimum value of peak signal to noise ratio (PSNR) in successively reconstructed images with respect to the input image; and
compensating, by the bias control circuit, for a bias in the successively reconstructed images, wherein the bias is compensated based on the decoded image.

21. The method according to claim 20, further comprising generating, by the bias control circuit, a pseudo random number for the transform coefficient based on the first condition.

22. The method according to claim 20, wherein
the set of conditions further includes a second condition, in the second condition,
the transform coefficient is associated with the non-zero quantization parameter,
the absolute value of the transform coefficient is zero, and
the specific transform block that includes the transform coefficient is obtained through column Discrete Cosine Transformation (DCT) of a patch of the input image, and the method further comprising generating, by the bias control circuit, a pseudo random number for the transform coefficient based on the second condition.

23. The method according to claim 20, wherein the set of conditions further includes a third condition, in the third condition, the transform coefficient is associated with the non-zero quantization parameter, the absolute value of the transform coefficient is zero, and at least one of a chroma block and a luma block associated with the transform coefficient exhibits a specific coefficient distribution pattern, and the method further comprising generating, by the bias control circuit, a pseudo random number for the transform coefficient based on the third condition.

\* \* \* \* \*